US006651131B1

(12) United States Patent
Chong, Jr. et al.

(10) Patent No.: US 6,651,131 B1
(45) Date of Patent: Nov. 18, 2003

(54) HIGH BANDWIDTH NETWORK AND STORAGE CARD

(75) Inventors: Fay Chong, Jr., Cupertino, CA (US); Whay Sing Lee, Newark, CA (US); Nisha Talagala, Fremont, CA (US); Chia Yu Wu, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 409 days.

(21) Appl. No.: 09/656,354

(22) Filed: Sep. 6, 2000

(51) Int. Cl.[7] .................. G06F 13/00; G06F 15/177; G06F 15/173
(52) U.S. Cl. .................. 710/317; 710/303; 709/220; 709/239
(58) Field of Search ................ 710/317, 100, 710/301, 302, 303, 304; 709/220, 239, 242

(56) References Cited

U.S. PATENT DOCUMENTS 5,936,955 A  *  8/1999  Aimoto et al. ............. 370/389
5,937,176 A  *  8/1999  Beasley et al. ............. 710/317
5,953,314 A  *  9/1999  Ganmukhi et al. ......... 370/220
5,974,496 A      10/1999  Miller
6,418,492 B1  *  7/2002  Papa et al. .................. 710/302

* cited by examiner

Primary Examiner—Tim Vo
(74) Attorney, Agent, or Firm—Blakely, Sokoloff, Taylor & Zafman

(57) ABSTRACT

A network and storage I/O device is described for use with a host computer system having a system bus coupled to a host processor and a main memory to provide a high bandwidth network server system. The network and storage I/O device includes a plurality of network controllers to communicate with client computers connected over a network, a plurality of storage controllers to transfer data to and from storage devices, at least one memory element to temporarily store data transferred between the network controllers and the storage controllers and a crossbar switch having a plurality of nodes to interconnect the plurality of network controllers, the plurality of storage controllers and the at least one memory element. The network and storage I/O device also includes a bridge coupled between one of the nodes and the system bus of the host computer.

22 Claims, 4 Drawing Sheets

HIGH BANDWIDTH NETWORK AND STORAGE CARD

BACKGROUND OF THE INVENTION

1. Field of the Invention

The present invention generally relates to computer networks, and in particular, to a network and storage input/output (I/O) device.

2. Description of the Related Art

Computer systems connected to networks can be used as storage servers, i.e., their main function is to provide a facility for storing and retrieving data for use by clients connected to the network. The data is typically stored on disk drives and a client request and data travel on the network and enter/leave the storage server via a network controller card. One performance limitation of the storage server is the bandwidth of the communication path between its associated network controller and storage controller.

FIG. 1 depicts a simplified representation of a conventional storage server architecture 100. In many implementations, a network controller 102 and a storage controller 104 are coupled to the same host system bus 106. The operation of this conventional storage server architecture 100 is as follows. A data request made by a client is received by the network controller 102 from a network. The client request is transferred into a main memory 108 of a host computer system 110 and a host processor 112 is then notified of the transfer by an interrupt. The host processor 112 processes the client request in the main memory 108. If the requested operation is a data fetch, the storage controller 104 sets up the DMA (direct memory access) transfer and the appropriate read commands are sent to a storage device. The data is then transferred from the storage device to the main memory 108. When the transfer is completed, the host processor 112 sets up the DMA transfer to the network controller 102 and initiates the transfer. One major performance limitation imposed by this approach is that the requested data traverses the system bus 106, is stored in the main memory 108 and then traverses the system bus 106 again. The bandwidth limitation of the system bus 106 and the main memory 112 restricts the number of network and storage controllers that can be supported by the storage server 100, even though the host processor 112 may have sufficient cycles to support more network and storage controllers.

Previously, there have been proposals which combine a network controller and a storage controller on a single network and storage I/O card, such as disclosed in U.S. Pat. No. 5,974,496 and shown in FIG. 2. In this network and storage I/O card 200, a network controller 202, a storage controller 206, and an optional memory 204 are connected via a single PCI internal bus 208. Some of the disadvantages associated with this network and storage I/O card architecture 200 are (1) only one storage controller 206 and one network controller 202 are utilized and (2) the single PCI internal bus 208 limits the bandwidth between the network controller 202 and the storage controller 206.

Therefore, there is a need to provide an apparatus which addresses such bandwidth limitation problem imposed by the conventional network and storage server systems.

SUMMARY OF THE INVENTION

According to one aspect of the invention, a network and storage I/O device is provided for use with a host computer system having a system bus coupled to a host processor and a main memory to provide a high bandwidth network server system. The network and storage I/O device includes a plurality of network controllers to communicate with client computers connected over a network, a plurality of storage controllers to transfer data to and from storage devices, at least one memory element to temporarily store data transferred between the network controllers and the storage controllers and a crossbar switch having a plurality of nodes to interconnect the plurality of network controllers, the plurality of storage controllers and the at least one memory element. The network and storage I/O device also includes a bridge coupled between one of the nodes and the system bus of the host computer.

DETAILED DESCRIPTION OF THE INVENTION

Implementations of the present invention are described herein for purposes of illustration, namely a network and storage I/O card for providing a high bandwidth network server system. The high bandwidth network server system of the present invention is capable of servicing multiple requests from different clients simultaneously by connecting a number of network controllers, a number of storage controllers and a number of memory elements together such that data paths between network controllers and the storage controllers need not involve a host system I/O bus and a host system's main memory.

Figure 1:
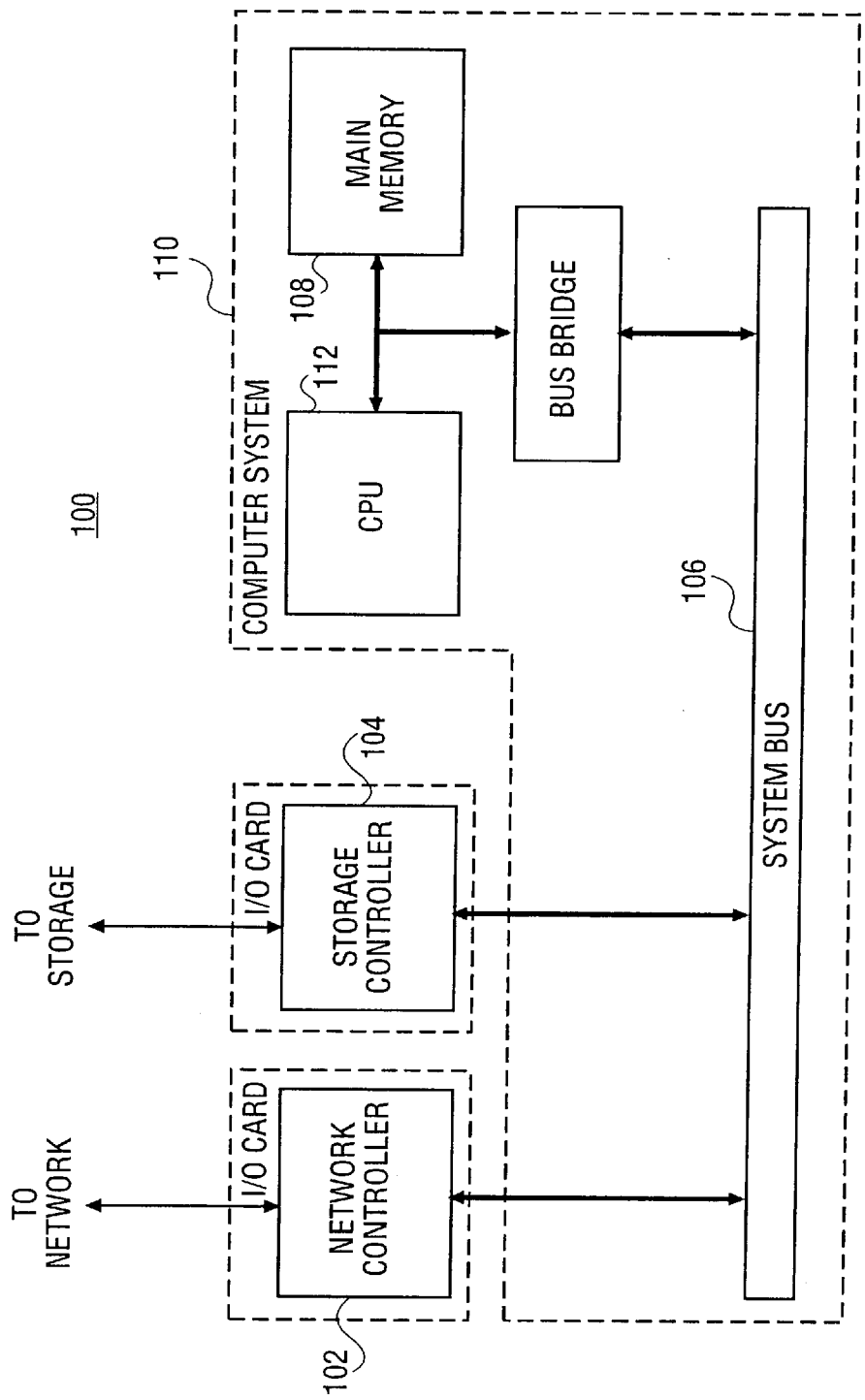
FIG. 1 is a block diagram of a conventional network storage server architecture.
Figure 2:
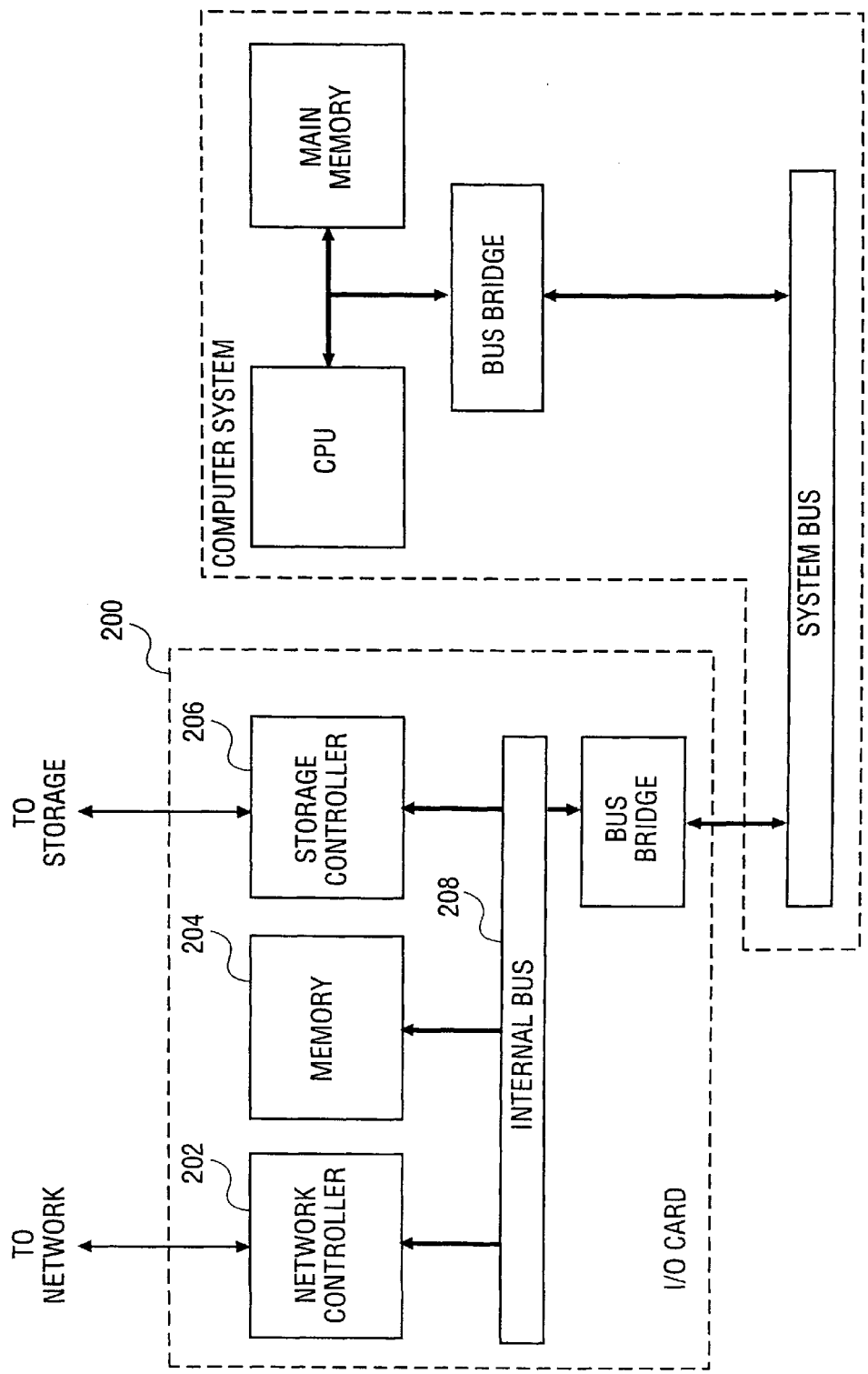
FIG. 2 is a block diagram of a conventional network controller and a storage controller incorporated in a single network and storage I/O card.
Figure 3:
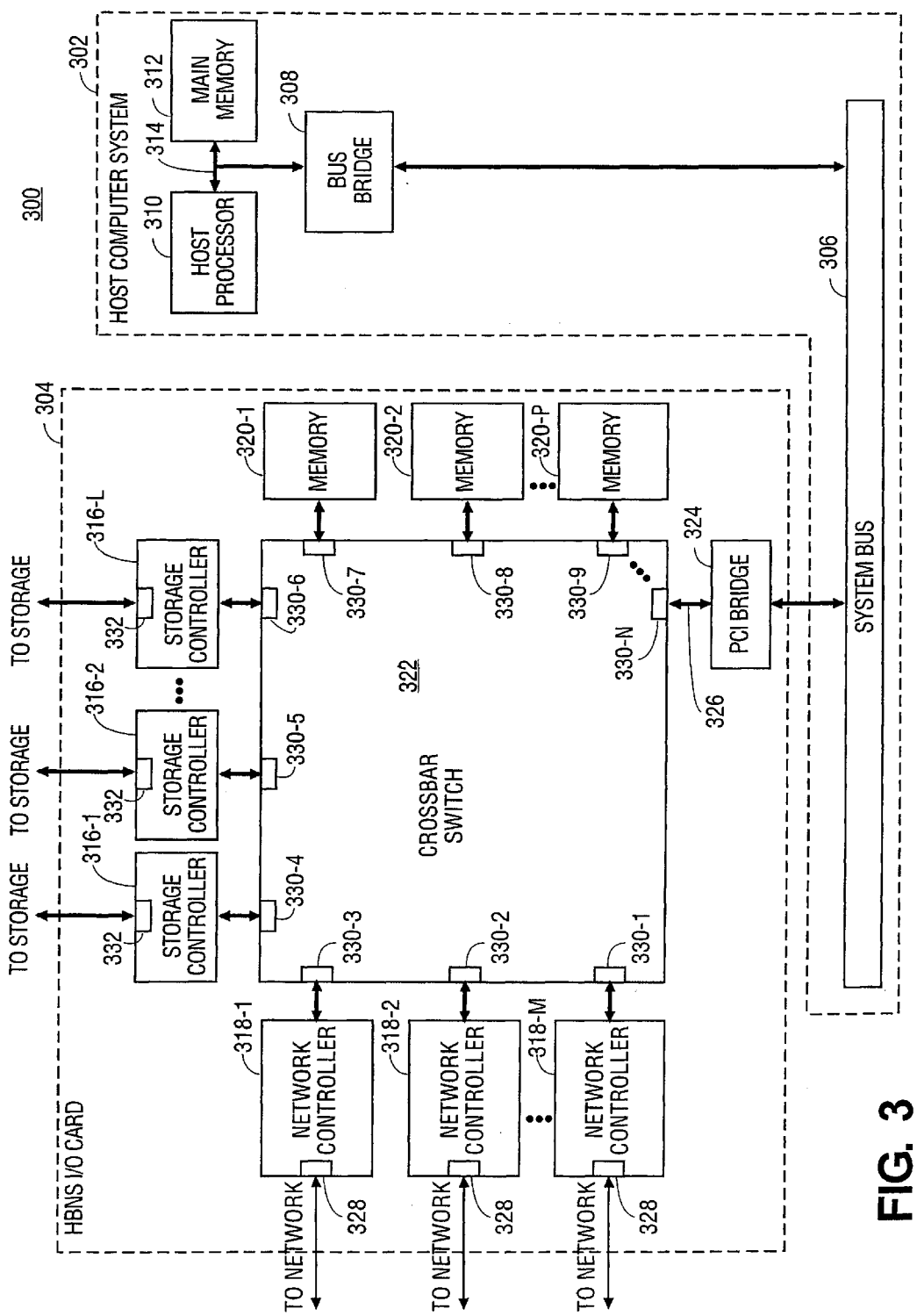
FIG. 3 is a block diagram of a high bandwidth network and storage I/O card in connection with a host computer system according to one embodiment of the present invention.

FIG. 3 depicts a block diagram of a high bandwidth network server system 300 in accordance with one embodiment of the present invention. Included in the network server system 300 is a host computer system 302 which may be any conventional computer system such as personal computer, workstation, mainframe and the like. The host computer system 302 is in connection with a high bandwidth network and storage I/O card 304 (referred hereinafter as "HBNS card"). The HBNS card 304 is coupled to the host computer system 302 via a host system bus 306. In one embodiment, the system bus 306 is embodied in the form of a Peripheral Component Interconnect (PCI) bus. In the illustrated embodiment, the host system bus 306 is connected into a bus bridge 308, which in turn is connected to a host processor 310 and a main memory 312 via a memory bus 314.

The HBNS card 304 has a number of storage-device ports 332 for detachably coupling with external storage devices. The storage-device ports 332 are in connection with storage controllers 316-1 through 316-L, each configured to control transfer of information to and from one or more external storage devices. The storage devices may include non-volatile memory for storing data, such as a magnetic disk or tape, an optical storage device such as CD-ROM (Compact Disk-ROM), CD-R (CD-recordable), DVD (Digital Versatile Disk), a magneto-optical (MO) device or the like. The HBNS card 304 also includes a number of network ports 328 for detachably coupling with network communications links. The network ports 328 are in connection with network controllers 318-1 through 318-M to facilitate communication with client computers connected over a network.

Internal memory elements 320-1 through 320-P are provided on the HBNS card 304 to temporarily store data transferred between any one of the storage controllers 316 and any one of the network controllers 318. In one embodiment, each storage controller 316 includes a processing facility (e.g., DMA logic) to perform DMA data transfers between the storage devices and any one of the memory elements 320 on the HBNS card and host main memory 312. Similarly, each network controller 318 includes a processing facility (e.g., DMA logic) for performing DMA data transfer between a client computer connected via a network and any one of the memory elements 320 on the HBNS card 304 and host main memory 312. In the illustrated embodiment, three storage controllers 316, three network controllers 318, three memory elements 320 are shown; however any number of these elements may be used (e.g., 2, 3, 4, etc).

In accordance with one aspect of the present invention, a crossbar switch 322 is incorporated into the HBNS card 304 to selectively provide multiple communication paths between pairs of elements coupled to the crossbar switch. The crossbar switch 322 includes a number of nodes 330-1 through 330-N, to which the network controllers 318, the storage controllers 332 and the internal memory elements 320 are connected. In one embodiment, each node of crossbar switch 322 serves as both an input and output connection. One of the crossbar switch nodes is connected to a PCI (peripheral component interconnect) bridge 324 via a local bus 326, the PCI bridge 324 is in turn is connected to the system bus 306 to provide communication with the host processor 310 and the main memory 312. Although in the illustrated crossbar switch 322, ten nodes 330 are shown, it should be understood that the number of nodes in the crossbar switch is arbitrary and could be any number. It should also be understood that the present invention is not dependent on the type of crossbar switch used, and thus the present invention can be implemented with many different crossbar switch configurations.

In one embodiment, the HBNS card 304 is a single physical device that combines a number of network controllers 318, a number of storage controllers 332 and a number of internal memory elements 320 interconnected by a crossbar switch 322 into a single input/output (I/O) card package.

The crossbar switch 322 is operative on a cycle-by-cycle basis to selectively provide multiple communication paths between multiple pairs of crossbar switch nodes. The crossbar switch 322 is programmable to dynamically reconfigure any of its connections to connect any one node to any other node, during operation. In other words, a data packet is routed by the crossbar switch from any one node (i.e., a source node) to any other node (i.e., a destination node) based on destination address information specified in the data packet. The crossbar switch can provide a full bandwidth connection between any two elements connected to the switch. Therefore, there can be N/2 connections operating at full bandwidth simultaneously when there are N elements connected to the switch. In this regard, the present invention provides a significant advantage over the conventional network and storage cards which use an internal bus to provide connection among a storage controller, a network controller and a memory element, since the bus only allows one pair of elements to communicate during any one interval of time. Accordingly, the HBNS card 304 of the present invention is capable of supporting a number of network controllers and a number of storage controllers to enable the network server system 300 to service multiple disk requests from different clients simultaneously.

In accordance with another aspect of the present invention, the data path between any one network controller 318 and any one storage controller 316 does not involve the main memory 312 and the system bus 306. This is achieved by buffering the data specified in a read request from storage devices into one of the memory elements 320 before transmitting the data to a requesting client via a network controller 318 to minimize involvement of the system bus 306 between the host computer system 302 and the HBNS card 304. Similarly, data associated with a write request is buffered into one of the memory elements 320 via one of the network controllers 318 before the data is transferred to one of the storage devices. Because the data path between any one memory element 320 and any one network controller 318 is through the crossbar switch, multiple data transfers between multiple memory elements and multiple network controllers can be achieved simultaneously. Similarly, multiple data transfers between multiple memory elements and multiple storage controllers can also be achieved.

In use, when a client computer requests data from one of the storage devices, the data request is sent over the network to one of the network controllers 318 residing on the HBNS card 304. The network controller 318 performs a DMA operation to directly transfer the data request to the main memory 312 of the host computer system 302, or alternatively, to one of the memory elements 320 residing on the HBNS card 304. The host processor 310 is then notified of the transfer by an interrupt, whereupon the data request is recognized and processed by the host processor. If the requested operation is a data fetch, this processing of the data request ultimately results in a read command(s) sent to one of the storage controllers 316. In response to the read command(s) received from the host processor 310, the storage controller 316 performs a DMA operation to directly transfer the data specified in the data request from a corresponding storage device to one of the memory elements 320 on the HBNS card 304. Once the DMA transfer has been completed, the host computer system 302 sets up and starts the transfer of the data from the memory element 320 to one of the network controllers 318. In this regard, the requested data from the storage device does not travel over the system bus 306 to minimize involvement of the system bus and the main memory 312 of the host computer system 302. Since the performance of the network server system 300 is not limited by its host system bus bandwidth and can scale with the number of network and storage controllers on the HBNS card, simultaneous data transfers between multiple storage controllers and multiple network controllers are possible.

Similar techniques as those described above can also be used to perform a disk write access requested by a client computer. That is, if a disk write request is received by one of the network controllers 318, the data specified in the disk write request is transferred by the network controller to one of the memory elements 320 on the HBNS card. The host processor 310 is then notified of the transfer by an interrupt. Once the host processor is notified of the request, the host processor processes the disk write request by setting up the transfer of the data specified in the disk write request from the corresponding memory element 320 to one of the storage controllers 316. The host processor 310 sends a write command(s) to the selected storage controller, which causes it to performs a DMA operation to transfer the data specified in the disk write request from a memory element 320 to a storage device. In this regard, the data from the client computer is written onto the storage devices without reducing available host system bus bandwidth.

The above-described operations may be coordinated by the host processor running a driver to interface the HBNS card to the host computer system and to control the flow of data between various elements connected to the crossbar switch. The driver routine is preferably configured to maximize the usage of the internal memory elements residing on the HBNS card to transfer requested data between the storage controllers and the network controllers and minimize the usage of the system bus and the main memory of the host computer system.

As will be understood by one of ordinary skill in the art, the HBNS card can be configured so that the programmer model views the network controllers, storage controllers and memory elements in the same address space even though a crossbar switch is utilized. In this way, a software program written for a traditional system can be utilized with the HBNS card with little or no modification. Such is within the scope and contemplation of the present invention.

Figure 4:
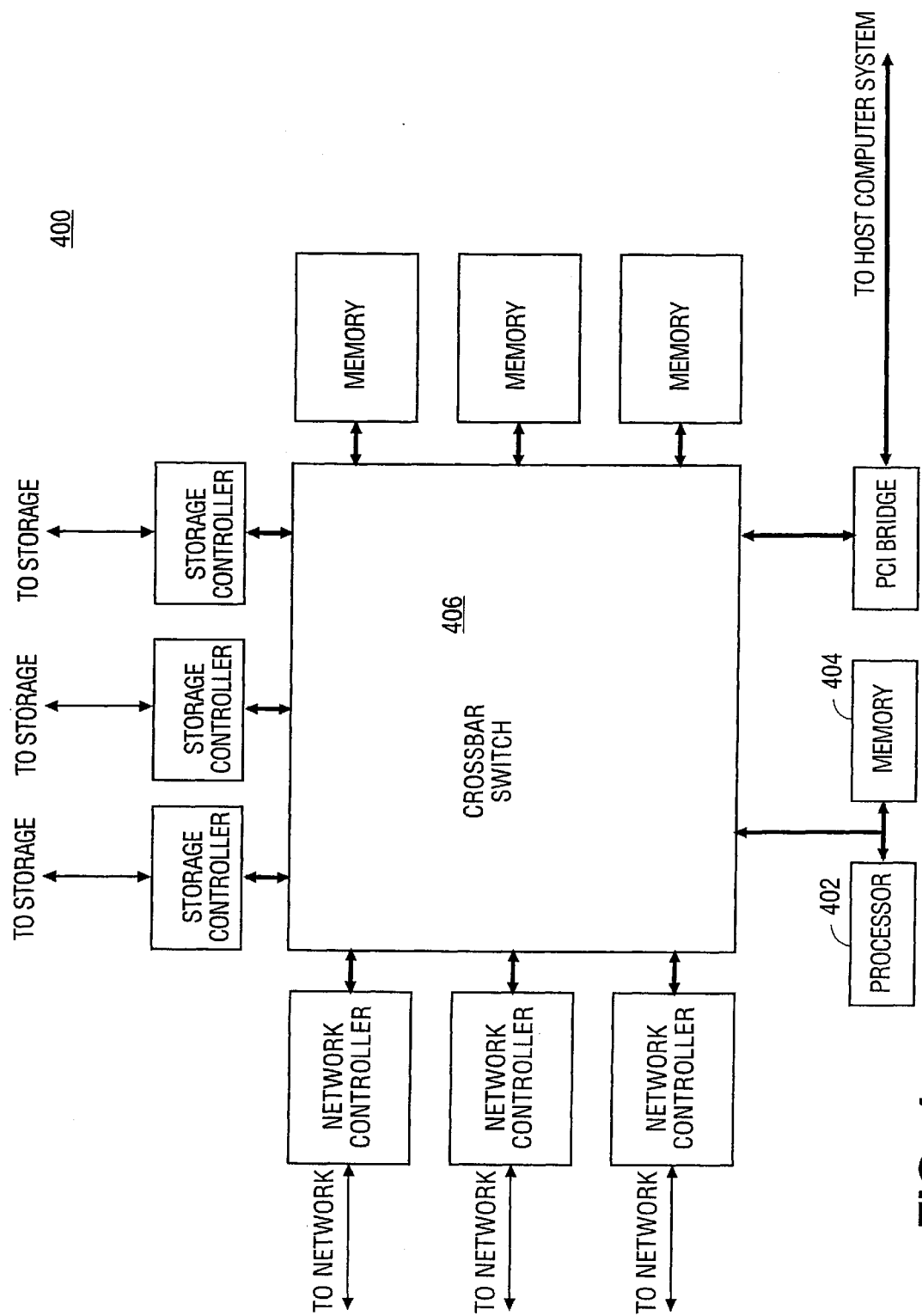
FIG. 4 is a block diagram of a network and storage I/O card according to another embodiment of the present invention.

FIG. 4 depicts a block diagram of a HBNS card 400 in accordance with another embodiment of the present invention. In this embodiment, a local processor 402 such as a SPARC (Scalable Processor Architecture) processor available from Sun Microsystems and a local memory 404 such as a RAM (random access memory) are integrated into the HBNS card 400 to offload some of the processing from the host computer system. The local processor is coupled to one of the crossbar switch nodes to control the flow of data between various elements connected to the crossbar switch 406. The local memory 404 is coupled to the local processor 402 for storing, among other things, driver routines for execution by the processor 402.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An apparatus comprising:
    a plurality of network controllers to communicate with client computers connected over a network;
    a plurality of storage controllers to transfer data to and from storage devices;
    at least one memory element to store data transferred between said plurality of network controllers and said plurality of storage controllers; and
    a crossbar switch having a plurality of nodes, wherein said plurality of network controllers, said plurality of storage controllers, and said at least one memory element are interconnected using the crossbar switch such that a data path between said at least one memory element and any one of said network controllers and said storage controllers is through the crossbar switch.

2. The apparatus of claim 1, wherein said plurality of network controllers, said plurality of storage controllers, said at least one memory element and said crossbar switch are integrated into a single input/output (I/O) card.

3. The apparatus of claim 1, wherein the crossbar switch is operative on a cycle-by-cycle basis to selectively provide multiple communication paths between pairs of the crossbar switch nodes.

4. The apparatus of claim 1, further comprising a bridge coupled between one of the crossbar switch nodes and a system bus of a host computer system having a host processor and a host memory.

5. The apparatus of claim 1, wherein the storage controllers includes a processing facility to perform direct memory access (DMA) data transfer (a) between the storage devices and said at least one memory element and (b) between the storage devices and the host memory.

6. The apparatus of claim 1, wherein the network controllers includes a processing facility to perform direct memory access (DMA) data transfer (a) between the client computers connected over the network and said at least one memory element and (b) between the client computers connected over the network and the host memory.

7. The apparatus of claim 1, further comprising a local processor running a driver routine to control the flow of data between the network controllers, the storage controllers and the memory element connected to the crossbar switch.

8. The apparatus of claim 2, wherein the I/O card further comprises a plurality of network ports, each network port coupling one of said plurality of network controllers with a network communications link and a plurality of storage-device ports, each storage-device port coupling one of said plurality of storage controllers with an external storage device.

9. The apparatus of claim 2, wherein said I/O card is configured such that a programmer model views said plurality of network controllers, said plurality of storage controllers and said at least one memory element in the same address space.

10. The apparatus of claim 4, wherein data specified in a read request is transferred from one of said storage controllers to one of said network controllers without using the system bus.

11. The apparatus of claim 4, wherein data specified in a write request is transferred from one of said network controllers to one of said storage controllers without using the system bus.

12. The apparatus of claim 4, wherein the system bus is embodied in the form of a Peripheral Component Interconnect (PCI) bus.

13. A system comprising:
    a host processor;
    a main memory;
    a system bus connected to the host processor and the main memory; and
    an input/output (I/O) device connected to said system bus, said I/O device having a plurality of network controllers to communicate with client computers connected over a network, a plurality of storage controllers to control transfer of data to and from storage devices, at least one memory element to temporarily store data transferred between the storage devices and the client computers, and a dynamically reconfigurable switching network coupled to said system bus, wherein said plurality of network controllers, said plurality of storage controllers, said at least one memory element are interconnected using said dynamically reconfigurable switching network such that a data path between said at least one memory element and any one of said network controllers and said storage controllers is through the dynamically reconfigurable switching network.

14. The system of claim 13, wherein said dynamically reconfigurable switching network comprises a crossbar switch having a plurality of nodes.

15. The system of claim 13, wherein the I/O device further comprises a bridge coupled between one of the crossbar switch nodes and the system bus.

16. The system of claim 13, wherein data specified in read or write requests is transferred between one of said storage controllers to one of said network controller without utilizing the system bus.

17. The system of claim 13, wherein the I/O device further comprises a local processor and a local memory coupled to one of the crossbar switch nodes to control flow of data between various elements connected to the crossbar switch.

18. The system of claim 14, wherein the crossbar switch is operative on a cycle-by-cycle basis to selectively provide multiple communication paths between pairs of the crossbar switch nodes.

19. An input/output (I/O) device, comprising:
a plurality of network interfacing means for communicating with clients connected over a network;
a plurality of storage interfacing means for transferring data to and from external storage devices;
at least one memory to store data transferred between the network interfacing means and the storage interfacing means; and
switching network means for selectively providing multiple communication paths between pairs of elements connected thereto, wherein said plurality of network interfacing means, said plurality of storage interfacing means and said memory are interconnected using the switching network means such that a data path between said memory and any one of said network interfacing means and said storage interfacing means is through said switching network means;
a plurality of storage interfacing means for transferring data to and from external storage devices;
a plurality of memories; and
switching network means for interconnecting said plurality of network interfacing means, said plurality of storage interfacing means and said plurality of memories, said switching network means operative to selectively provide multiple communication paths between pairs of elements connected thereto.

20. The I/O device of claim 19, further comprising a plurality of network ports in connection with said plurality of network interfacing means for coupling with a network communications link and a plurality of storage-device ports in connections with said plurality of storage interfacing means for coupling with the external storage devices.

21. The I/O device of claim 19, wherein the switching network means comprises a crossbar switch having a plurality of nodes.

22. The I/O device of claim 21, further comprising a bridge coupled to one of the crossbar switch nodes for connecting to a system bus of a host computer system having a host processor and a host memory.

* * * * *